(12) United States Patent
Zhi et al.

(10) Patent No.: US 7,791,534 B1
(45) Date of Patent: *Sep. 7, 2010

(54) GNSS TIME FRACTION CALIBRATION OF A REAL TIME CLOCK

(75) Inventors: Xiaorong Zhi, Fremont, CA (US); Yiming Yu, Cupertino, CA (US); Joseph W. Fontes, San Jose, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/381,562

(22) Filed: Mar. 13, 2009

Related U.S. Application Data

(63) Continuation of application No. 11/437,502, filed on May 19, 2006, now Pat. No. 7,532,159.

(51) Int. Cl.
*H04B 7/185* (2006.01)
(52) U.S. Cl. ................................. 342/357.12
(58) Field of Classification Search ................
342/357.01–357.17
See application file for complete search history.

(56) References Cited

U.S. PATENT DOCUMENTS

| | | | |
|---|---|---|---|
| 5,594,453 A | 1/1997 | Rodal et al. | 342/357 |
| 5,629,708 A | 5/1997 | Rodal et al. | 342/357 |
| 5,854,605 A | 12/1998 | Gildea | 342/357 |
| 5,893,044 A * | 4/1999 | King et al. | 701/214 |
| 6,662,107 B2 | 12/2003 | Gronemeyer | 701/213 |
| 6,714,160 B2 | 3/2004 | McBurney | 342/357.15 |
| 6,778,136 B2 | 8/2004 | Gronemeyer | 342/357.15 |
| 7,019,689 B1 * | 3/2006 | McBurney et al. | 342/357.06 |
| 7,084,810 B2 * | 8/2006 | Kitatani | 342/357.12 |
| 7,123,190 B1 | 10/2006 | McBurney et al. | 342/357.15 |
| 7,139,225 B2 | 11/2006 | Farmer | 368/46 |
| 7,190,307 B2 | 3/2007 | Gronemeyer | 342/357.15 |
| 7,362,263 B2 | 4/2008 | McBurney et al. | 342/357.02 |
| 7,532,159 B2 * | 5/2009 | Zhi et al. | 342/357.12 |
| 2006/0195260 A1 | 8/2006 | Gronemeyer | 701/213 |

* cited by examiner

*Primary Examiner*—Thomas H Tarcza
*Assistant Examiner*—Nga X Nguyen
(74) *Attorney, Agent, or Firm*—David R. Gildea

(57) ABSTRACT

A generic navigation satellite system (GNSS) signal receiver having a fast time to first fix by calibrating a low power always-on real time clock (RTC). The receiver includes an RTC calibrator having a fraction calculator. The RTC calibrator may also include a time expander. Before the receiver is powered off, the fraction calculator uses the fine resolution of GNSS time for determining a time fraction for RTC time. When the receiver is powered back on, the time expander uses an estimate of RTC time drift during the time that GNSS receiver had power off and the time fraction for calibrating and increasing the resolution of the RTC time for an RTC time tick. A signal navigation processor uses the calibrated RTC time for assisting a first fix with code phase search, integration time periods, resolution of epoch integer and/or location-in-space of GPS satellites.

21 Claims, 12 Drawing Sheets

GNSS TIME FRACTION CALIBRATION OF A REAL TIME CLOCK

CROSS REFERENCE TO RELATED APPLICATIONS

This application is a continuation of application Ser. No. 11/437,502 filed May 19, 2006 now U.S. Pat. No. 7,532,159.

BACKGROUND

1. Field of the Invention

The invention relates generally to global navigation satellite system (GNSS) receivers having fast times to first fix and particularly to a GNSS receiver that uses a calibrated real time clock (RTC) time for determining a first fix of GPS position and time.

2. Background

The United States government maintains a global positioning system (GPS) having a constellation of earth orbiting GPS satellites. The satellites broadcast GPS signals having location-determination information that can be received and decoded in a GPS receiver for determining a GPS time and a GPS-based geographical position of the receiver.

The acquisition process for finding signal power in a GPS signal involves correlating a pseudorandom noise (PRN) code from incoming satellite signals against locally generated PRN code replicas at incremental time offsets or phase shifts with respect to a local GPS reference clock. The code replicas are phase shifted through an entire code epoch until the phase shifts are found that provide the highest correlations. This process is known as a code search. A raw pseudorange is measured as the time offset between the time-of-arrival of the PRN code received in the GPS satellite signal and the locally generated replica of the PRN code with respect to the local reference clock. The prefix "pseudo" is used to indicate that the range that has an ambiguity due to the time ambiguity of the local reference clock. The GPS receiver then determines data bit timing from inversions of the correlations. The data bit timing, the raw pseudorange and an integer number of code epochs are used in the determination of the total pseudoranges between the receiver and the source of the GPS satellite signal.

When signal power and data bit timing is found, the GPS receiver monitors the data bits until Z-counts are decoded. A GPS time-of-transmission is read from the Z-count for each GPS satellite. The GPS times-of-transmission are used with ephemeris information that is available in the GPS signal data bits or stored locally and updated at intervals for calculating the present locations-in-space of several GPS satellites. Having the locations-in-space and pseudoranges for four or more GPS satellites, the GPS receiver solves simultaneous equations to correct the time ambiguity in the local GPS reference clock and resolve the three dimensions of the geographical position of the GPS receiver.

In a first problem, in some places there is not enough energy available in the GPS signal for signal acquisition by correlation over an integration time period that is limited to a single code epoch. A GPS receiver could perhaps overcome this problem by accumulating correlations over integration time periods greater than one code epoch. However, this is difficult because the correlations are inverted by changes in senses of the GPS data bits. Workers have proposed storing the expected GPS data bits in order to calibrate for the correlation inversions. However, in order to use the expected data bits, the transition times are needed. This leaves a standoff where the multi-epoch integration time period that is required for signal acquisition in order to read the accurate GPS time requires an accurate timing of the bit transitions, but the accurate timing of the bit transitions is not available until signal acquisition has been obtained using the multi-epoch integration period.

In a second problem, for many market applications GPS receivers need a fast time to a first fix (TTFF) of GPS position and time. One requirement in order to have a fast TTFF is the availability of the ephemeris orbital parameters in order to quickly compute the locations-in-space of the GPS satellites. Existing GPS receivers meet this requirement by storing ephemeris parameters from a recent fix or receiving the parameters in a radio signal. However, even when ephemeris parameters are available in the GPS receiver, an accurate local knowledge of time is required to use the ephemeris parameters for computing satellite locations-in-space. This time is normally received in the data bits of the GPS signal Z-count. Unfortunately, this adds time to the time to first fix because the Z-count repeats only every six seconds. Further, two passages of the Z-count may be necessary in order to verify that the Z-count is not being mimicked by other data bits.

Therefore, existing GPS receivers have had difficulty for low level signal acquisition and fast TTFF because an accurate time is not available in the GPS receiver before the signal is acquired and before a Z-count is decoded.

Existing GPS receivers have devices called real time clocks that are distinguished from other clocks in the GPS receiver, such as the microprocessor clock, the signal and navigation processor clocks and the internal GPS reference clock, by having their own resonant device and having extremely low power consumption. Real time clocks typically operate with a separate small battery to keep track of an approximate time even when the GPS receiver has power off. Existing GPS receivers commonly use time from the real time clock at power turn on in order to predict which GPS satellites are available in the sky and to estimate Doppler frequency shifts. It might at first be thought that such real time clock could be also used to provide the accurate time to assist the GPS receiver for signal acquisition at low signal levels by obviating the need to decode the Z-count. Unfortunately, existing real time clocks having sufficiently low power consumption to be allowed to be always-on do not have the time resolution that is required and have time drift rates that are too great to provide the time accuracy that is needed.

Three techniques have been used to provide accurate local times in GPS receivers at power turn on. A first technique uses an atomic clock. However, an atomic clock may more than double the cost of a modern small GPS receiver. A second technique uses a radio signal transfer time standard. However, the use of such radio signals adds a great deal of complexity of the GPS receiver and the signals are not always available. Further, the radio receiver may be more expensive than the GPS receiver. In a third technique, the local GPS reference clock that is required in the GPS receiver for correlations is used always-on in order to provide an accurate time at turn on. This technique requires that the local GPS reference clock is stabilized for long term accuracy and continues to be powered when the GPS receiver is off or in standby. The U.S. Pat. No. 5,629,708 "GPS Receiver Having an Initial Adjustment for Correcting for Drift in Reference Frequency" by Rodal et al and U.S. Pat. No. 5,854,605 "GPS Receiver Using Data Bit Timing to Achieve a Fast Time to First Fix" by Gildea, both incorporated herein by reference, exemplify this technique. However, the power consumption of the circuitry for the local GPS reference clock is sometimes too high to be always-on in a modern low power GPS receiver.

There is a need for an improved way for a GPS receiver to estimate an accurate local time at turn on for assisting signal acquisition and avoiding the need to receive a Z-count.

SUMMARY

It is therefore an object of the present disclosure to provide a GPS receiver having a fast time to first fix (TTFF) by calibrating a real time clock (RTC) and using the calibrated RTC time for assisting the determination of a first fix without the requirement of waiting for a Z-count in the GPS signal.

One embodiment of a GPS receiver has a frequency downconverter, a GPS reference clock and a signal navigation processor including an always-on real time clock (RTC) and an RTC calibrator. The RTC calibrator uses a difference between GPS time at an RTC time tick and a modulo GPS time instant at the RTC time tick for determining an RTC time fraction. The RTC time fraction and an estimated RTC time drift are used to calibrate the RTC time. The calibrated RTC time is used for assisting a first fix.

In an embodiment, an apparatus is a GPS receiver comprising an always-on real time clock for maintaining an RTC time having increments of a certain time period; an RTC calibrator including a fraction calculator for determining a time fraction of the certain time period when the receiver has power on, and an RTC time expander for using the time fraction for calibrating the RTC time when the receiver is switched from power off to power on; and a signal navigation processor for using the calibrated RTC time for assisting a determination of the first fix.

In another embodiment, a method comprises the steps of maintaining an RTC time when a GNSS receiver has power on and power off, the RTC time having increments of a certain time period; determining a time fraction of the certain time period when the GNSS receiver has power on; using the time fraction for calibrating the RTC time when the receiver is switched from power off to power on; and assisting a determination of the first fix with the calibrated RTC time.

Depending upon an explicit or implicit calibration error estimate, the assistance of the calibrated RTC time may be used for determining a subset of code phases for search, setting a timing boundaries for integration time periods, resolving a code epoch integers and/or computing locations-in-space of GPS satellites.

These and other objects and embodiments will no doubt become obvious to those of ordinary skill in the art after having read the following for carrying out the invention and viewing the various drawings.

DETAILED DESCRIPTION

The details of several embodiments for carrying out the ideas of the invention will now be presented. It should be understood that it is not necessary to embody all of these details in order to carry out the ideas of the invention. Several subsets and numerous alternatives, modifications and equivalents of the embodiments described below will undoubtedly be apparent to someone skilled in the art after reading these details as within the scope of the idea of this invention. The description of these details is not intended to eliminate these subsets, alternatives, modifications and equivalents from the basic idea of the invention that is presented below in the claims.

A system is described that uses global positioning system (GPS) signals modulated with a coarse/acquisition (C/A) spreading code. However, the system may be applied with other GPS signal codes. Further, the system may be carried out with a generic global navigation satellite system (GNSS) where the global positioning system (GPS), the global orbiting navigation system (GLONASS), the Galileo system or the like, or a combination of these systems provides signals having spreading codes. It should also be noted that pseudolites may be used in place of satellites for broadcasting GNSS signals.

Figure 1:
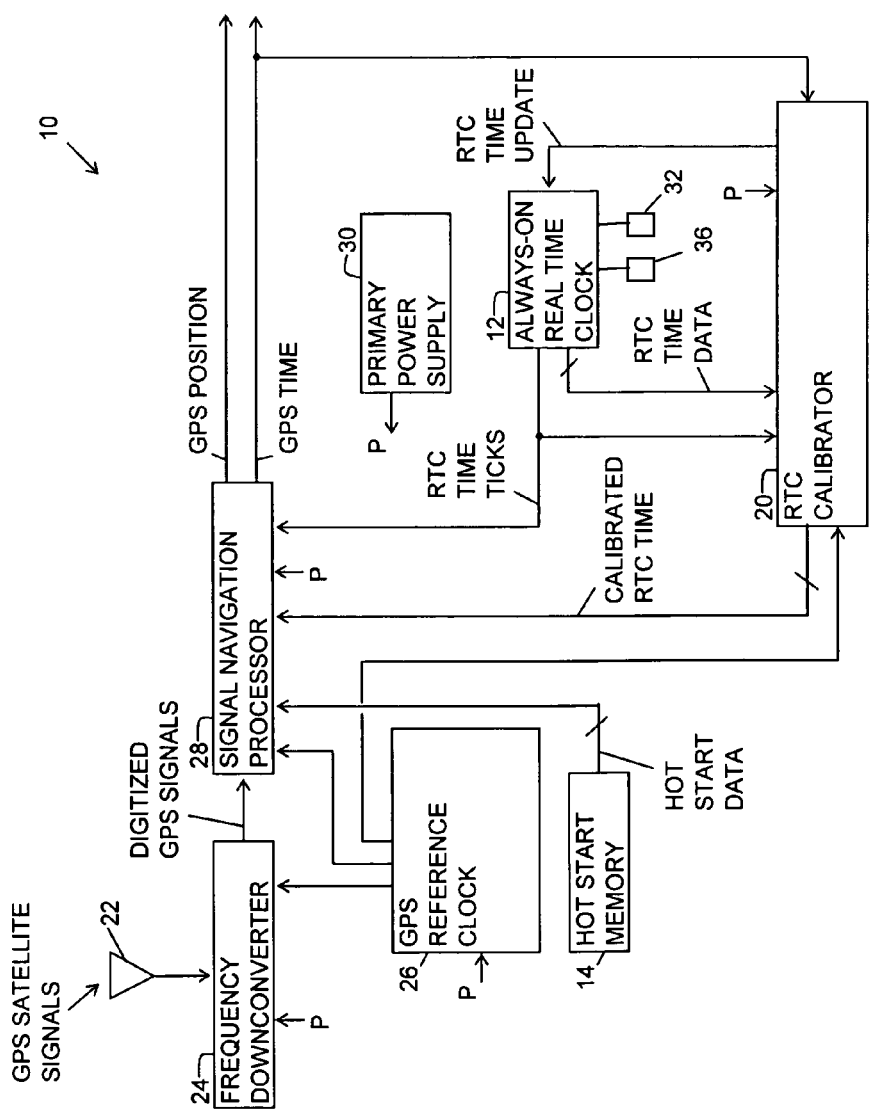
FIG. 1 is a block diagram of a GPS receiver having a fast time to first fix by calibration of a real time clock.

FIG. 1 is a block diagram of a GPS receiver 10. The GPS receiver 10 includes a real time clock 12, a hot start memory 14, a real time clock (RTC) calibrator 20, a GPS antenna 22, a frequency downconverter 24, a GPS reference clock 26, and a signal navigation processor 28. The signal navigation processor 28, real time clock 12 and RTC calibrator 20 are implemented together in one or more digital signal processor (DSP) integrated circuits where the real time clock 12 and RTC calibrator 20 are functional descriptions of hardware and software within the signal navigation processor 28.

A primary power supply 30 or supplies provides power to the GPS receiver 10 for acquiring and tracking GPS signals and issuing GPS fixes of time and position. A battery 32 provides power to the real time clock 12 separately from the primary power supply (or supplies) 30 for the other elements of the GPS receiver 10. The real time clock 12 is always on so that it can provide a coarse time when the GPS receiver 10 turns on. The RTC calibrator 20 calculates corrections for this coarse time for providing a calibrated RTC time.

The hot start memory 14 uses one or more non-volatile memory devices such as static random access memory (SRAM) for retaining hot start data while the GPS receiver 10 has power off. The term "power off" may refer to a standby mode where power consumption is reduced by freezing a clock signal and/or temporally breaking a connection between the primary power supply 30 and certain circuits so that they can restart in known states when the primary power is turned on. The terms "turn on" and "turn off" refer to switching the primary power on for normal operation of the GPS receiver for acquiring and tracking GPS signals and switching the primary power off. When the primary power is switched off, the GPS signal is not tracked. At turn on, the hot start data is used with a calibrated RTC time for assisting the acquisition and processing of GPS signals in order to reduce the time to first fix.

The GPS reference clock 26 provides several local reference frequency and time signals at several highly accurate frequencies and time period intervals, all being derived as frequency multiples (including M/N multiples) from a reference oscillator using a crystal having a precise and stable resonant frequency. The frequencies of the reference signals range from several hundred MHz for downconverting the GPS satellite signals down to about fifty Hertz for a data bit timer. The reference time signals are not as stable as GPS time but are much more stable than the time provided by the real time clock 12. However, the power consumption the GPS reference clock 26, typically 5 to 10 milliwatts or more, is much greater than the power consumption of the real time clock 12. Therefore, it is desirable in low power applications that the circuitry of the GPS reference clock 26 be powered down when the GPS receiver 10 is turned off, with the consequent loss of clock continuity when the GPS receiver 10 and the GPS reference clock 26 is turned back on.

The hardware for the real time clock 12 operates with extremely low power, not more than 1 milliwatt and preferably less than 5 microwatts, with its own oscillator and counter for maintaining a coarse account of time. Because of its low operating power, the real time clock circuitry 12 can remain powered on for a very long time when the GPS receiver 10 is off without depleting even a small battery 32.

The coarse time kept by the real time clock 12 is called the RTC time in order to distinguish it from the more precise local GPS reference clock time and the even more precise GPS time carried by the GPS satellite signals. In an exemplary case the real time clock 12 is a TMS320VC5503/5507/5509 real time clock that is available on a TMS320VC55x™ digital signal processor (DSP) integrated circuit from Texas Instruments of Dallas, Tex., and described in literature number SPRU594B published by Texas Instruments in June, 2004. This DSP integrated circuit is also used for signal and navigation processing in the signal navigation processor 28.

The low power time base oscillator for the real time clock 12 uses a resonant device 36, such as a common watch crystal having a resonant frequency of 32.768 kHz. In contrast the resonant devices for the GPS reference clock 26 and the signal navigation processor 28 use time base oscillators having resonant devices at 10 MHz or more. The very low frequency of the time base oscillator of the real time clock 12 is an aspect that contributes to its ability to operate at extremely low power.

The RTC time is in the form of data that advances by a prescribed time increment, preferably one second. An RTC time tick having a certain time period equal to the prescribed time increment designates the exact time (within the accuracy limitations of the real time clock 12) that the RTC time data is accurate. The signal navigation processor 28 reads the RTC time data at an interrupt induced by the RTC time tick or the signal navigation processor 28 polls the RTC time data at short time intervals and notes the polling times between which the data changes.

The GPS reference clock 26 is disabled when the GPS receiver 10 is in the power off condition, thereby losing the time continuity of the GPS reference clock 26 and losing the ability to carry an estimate of GPS time. When the GPS receiver 10 is turned on, the GPS receiver 10 acquires and processes the GPS satellite signals in the following manner. The GPS antenna 22 receives airwave GPS signals broadcast by several GPS satellites and converts the airwave GPS signals to a conducted form. The frequency downconverter 24 uses one or more reference signals from the GPS reference clock 26 in order to convert the conducted GPS signals to a lower frequency and then to digitize the lower frequency GPS signals.

The RTC calibrator 20 uses an RTC time fraction, the RTC time data and a calculated RTC time drift for calibrating the RTC time data at turn on. The signal navigation processor 28 uses the local frequency and time reference signals from the GPS reference clock 26 and the hot start data with the assistance of the calibrated RTC time for finding signal power for the digitized GPS signals and computing satellite pseudoranges. The assistance of the calibrated RTC time is termed internal time assistance to distinguish it from the external time assistance of a transfer time standard received in a radio signal from outside source. The signal navigation processor 28 uses four satellite pseudoranges for determining the GPS position of the antenna 22 and a correction to a time ambiguity for the GPS reference time and frequency signals. Fewer than four pseudoranges are sufficient when other positioning data is available or more than four pseudoranges can be used to compute an overdetermined solution for the GPS position and time and frequency signal correction.

After the GPS signal is acquired, the GPS signal is tracked with phase or frequency lock loops where the signal navigation processor 28 provides feedback from GPS signal correlations for adjusting, in the signal navigation processor 28, the frequencies and times of the reference signals that are generated by the GPS reference clock 26. The GPS signal tracking provides nearly continuous pseudoranges from which GPS position and time are nearly continuously computed. In the power off condition of the GPS receiver 10 the elements of the GPS receiver 10 except the real time clock 12 and hot start memory 14 are disabled by breaking the power connection or freezing clock signals.

Figure 2A:
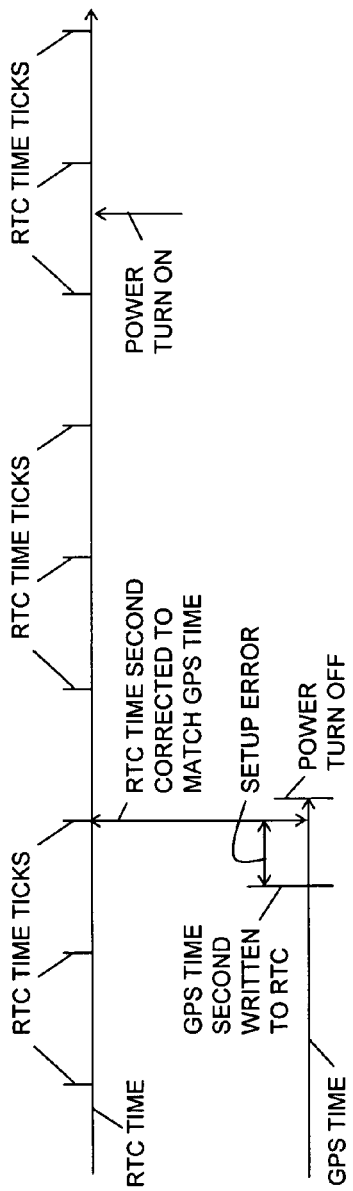
FIG. 2A is a time chart for a conventional GPS receiver.

FIG. 2A is a prior art time chart showing the relationship between GPS time and conventional RTC time provided by a real time clock. The RTC time has a one second resolution that is intended to be accurate at RTC time ticks. A conventional GPS receiver updates the RTC time seconds with current GPS time seconds by writing the current GPS time second into the real time clock. The time between the GPS time at the RTC time second at the time tick and the integer GPS time second is a setup error. The real time clock maintains the RTC time when the GPS receiver goes into a power down or standby mode.

When a conventional GPS receiver turns on, the RTC time second at the first RTC time tick is used for making various computations for assistance for the acquisition of GPS signals and the first fix of GPS position and a true GPS time. However, the setup error and the time drift of the RTC time during the power down time causes the error in the RTC time second at turn on to be too great to provide certain types of assistance.

Figure 2B:
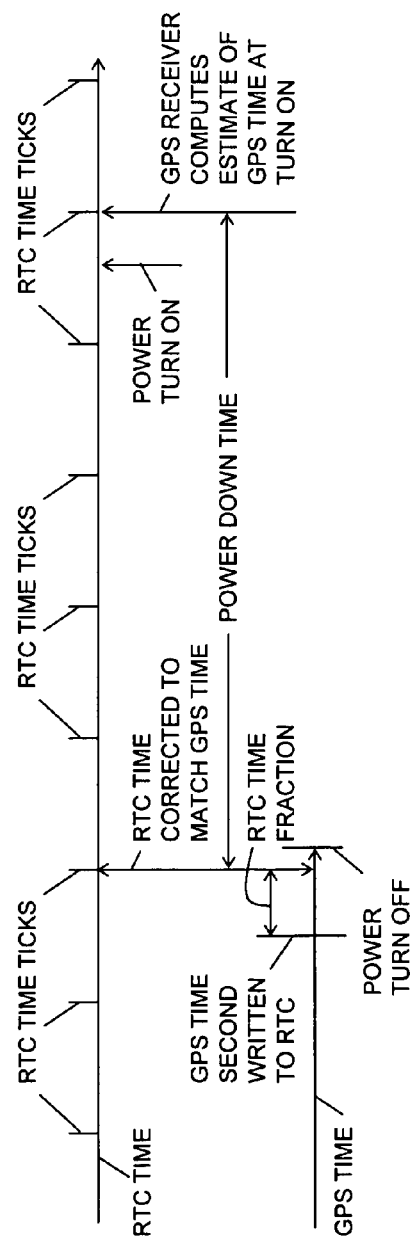
FIG. 2B is a time chart for the GPS receiver of FIG. 1.

FIG. 2B is a time chart showing the relationship between GPS time and the RTC time provided by the real time clock 12. The RTC time has a resolution of a certain time period, preferably one second, at RTC time ticks. The GPS receiver 10 updates the RTC time with current GPS time instants at the same resolution. The GPS receiver 10 writes the current modulo GPS time instant into the real time clock 12. The GPS time at the RTC time tick is noted and the difference between this time and the modulo GPS time instant that was written to the real time clock 12 is stored in the hot start memory 14 as the RTC time fraction. The real time clock 12 continues to keep RTC time when the GPS receiver 10 goes into a power down or standby mode.

When the GPS receiver 10 turns on, the time fraction is retrieved from the hot start memory 14 and used with a calculated RTC time drift for determining a calibration to the RTC time for the first RTC time tick. The calibrated RTC time is used as a close estimate of GPS time for making various computations for providing assistance for improving speed and signal sensitivity for the acquisition of GPS signals and the first fix of GPS position and a true GPS time.

Figure 3:
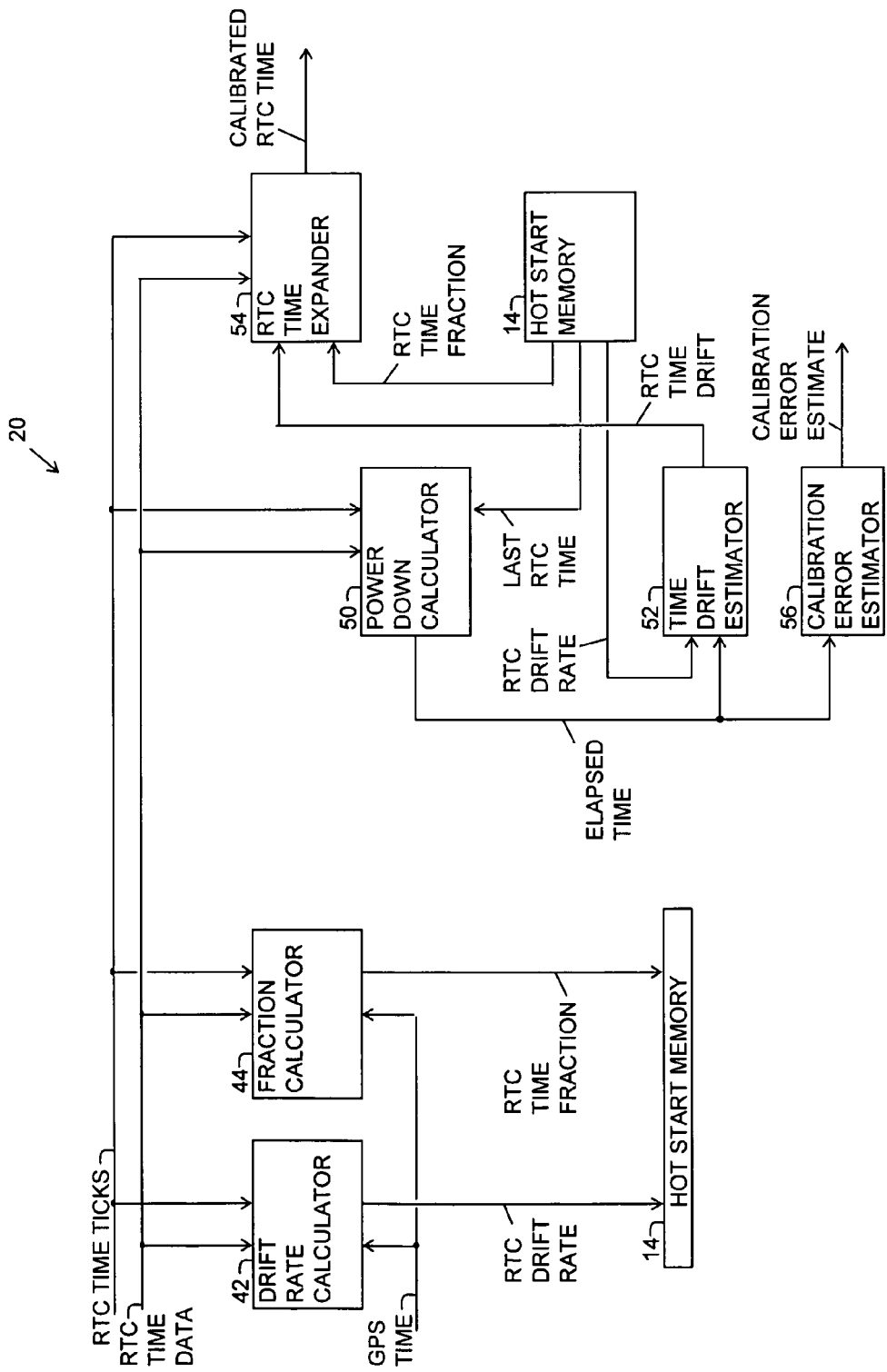
FIG. 3 is a block diagram of an RTC calibrator of the GPS receiver of FIG. 1.

FIG. 3 is a block diagram of the RTC calibrator 20. The RTC calibrator 20 includes a drift rate calculator 42, a fraction calculator 44, a power down calculator 50, a time drift estimator 52, an RTC time expander 54, and a calibration error estimator 56. When the GPS receiver 10 is in normal powered operation for providing GPS position and time, the drift rate calculator 42 stores a first RTC time and a corresponding GPS time at an RTC time tick. At a later time when the GPS receiver 10 is in normal operation, the RTC drift calculator 42 takes a second RTC time and a corresponding GPS time at an RTC time tick. In various embodiments, the first and second times may or may not be separated by time periods when the GPS receiver 10 is powered down. The drift rate calculator 42 calculates a difference between the first and second RTC times and a difference between first and second GPS times and uses the two differences for determining an RTC drift rate. The RTC drift rate is stored in the hot start memory 14.

A modulo GPS time instant (typically one second) is used to update the RTC time data for an RTC time tick (typically having a one second time period). The fraction calculator 44 uses the fine resolution of the GPS time, typically better than a few microseconds, for determining a fraction of the instant between the actual GPS time at the RTC time tick and the GPS time instant that is used to update the RTC time data. The fraction is stored in the hot start memory 14 as the RTC time fraction. The last RTC time data before the GPS receiver 10 is turned off is also stored in the hot start memory 14.

The power down calculator 50 takes a difference between the RTC time data at the first RTC time tick after turn on and the last RTC time data stored in the hot start memory 14 before power was turned off for providing an elapsed power down time. The time drift estimator 52 multiplies the elapsed time by the RTC drift rate for calculating an RTC time drift. The RTC time expander 54 uses the RTC time fraction from the hot start memory 14, the RTC time drift and the current RTC time data at the RTC time tick for providing a calibrated RTC time having a fine time resolution preferably in the range of a few microseconds to a few milliseconds.

The signal navigation processor 28 uses the calibrated RTC time as a current estimate of GPS time. The current estimate of GPS time is used with a recent position for the GPS receiver 10, ephemeris orbital parameters for the GPS satellites, GPS satellite health, and other data bits for expected GPS signals stored in the hot start memory 14 for acquiring and processing the GPS satellite signals for providing the first fix of GPS position and time.

At some time in development, manufacture or in the field, an error estimate is explicitly or implicitly estimated and stored in the hot start memory 14 or in the codes of instructions in the signal navigation processor 28 for the difference between the RTC drift rate that can be estimated and the actual, but unknown, RTC drift rate. The estimate can be based on experimental results or calculations from a data sheet for the resonant device used by the real time clock 12. The calibration error estimator 56 uses the elapsed time with the drift rate error estimate for providing a calibration error estimate.

The calibration error estimate is used for determining which stages in the determination of the first fix that the calibrated RTC time can be used for assistance. A table 1 below is used as an approximate start up assistance guide in terms of the estimate of the maximum calibration error.

TABLE 1

| Calibration Error Estimate | Manner Used |
|---|---|
| 500 microseconds | Code Phase Search for Signal Acquisition |
| 5 milliseconds | Integration Time Boundary for Signal Acquisition |
| 10 milliseconds | Resolution of Code Epoch Integer for Pseudorange |
| 10 milliseconds | Location-in-Space of GPS Satellite for Position Fix |

The calibration error estimates for the table 1 are shown numerically for the GPS C/A code in order to most simply convey an exemplar. For a generic navigation satellite system (GNSS) the maximum calibration error estimates should be less than about one-half the length of a code epoch for beneficial assistance in a code phase search, less than about one quarter a data bit period time for determining integration time period boundaries, and less than about one-half a data bit time period for resolving the code epoch pseudorange integer and determining fixes without receiving GNSS time data bits (Z-count for the C/A code) in the GNSS signal. It should be noted again that these times are an approximate guide. The maximum calibration errors may, in fact, be greater or lesser.

Figure 4:
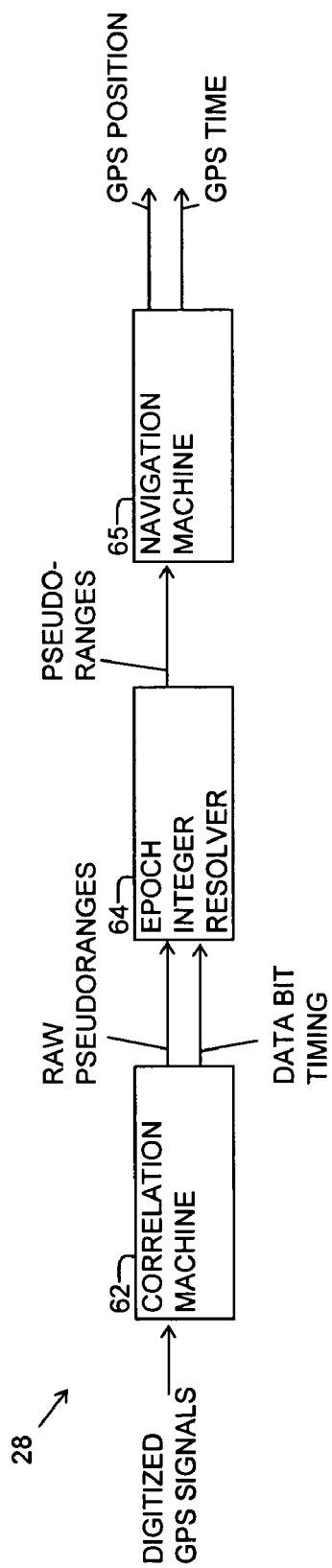
FIG. 4 is a block diagram of a signal navigation processor of the GPS receiver of FIG. 1.

FIG. 4 is a block diagram of the signal navigation processor 28. The signal navigation processor 28 functionally includes a correlation machine 62, an epoch integer resolver 64 and a navigation machine 65. The correlation machine 62 uses the local GPS reference clock signals, the hot start data and the calibrated RTC time for finding signal power in the digitized GPS signals and then processes the signal power for determining raw pseudoranges corresponding to the GPS signals from respective GPS satellites. The raw pseudoranges are the time offsets (sometimes expressed as code phases, code phase shifts, code phase offsets, or code chips) between a reference clock time from the GPS reference clock 26 and the times-of-arrival of the GPS satellite signals.

The raw pseudoranges include an ambiguity for the time offset of the local reference clock time with respect to GPS time at a modulo of a code epoch time (one millisecond for the GPS C/A code) or a data bit time (twenty milliseconds for the GPS C/A code). The correlation machine 62 determines the data bit timing from inversions in code correlations. The data bit timing is the modulo twenty millisecond (for GPS C/A code) time of the time-of-arrival of the GPS satellite signal. The integer resolver 64 determines the code epoch integer number from the hot start data and the calibrated RTC time.

The data bit timing, the raw pseudorange and an integer number of code epochs are used in the determination of the total pseudoranges between the receiver and the source of the GPS satellite signal. The navigation machine 65 includes a set of equations using four or more pseudoranges and sets of ephemeris orbital parameters with the calibrated RTC time in order to simultaneously solve for the time ambiguity of the GPS reference clock 26 at turn on and the three dimensions of space for providing the three dimensional position of the GPS antenna 22 and GPS time.

Figure 5:
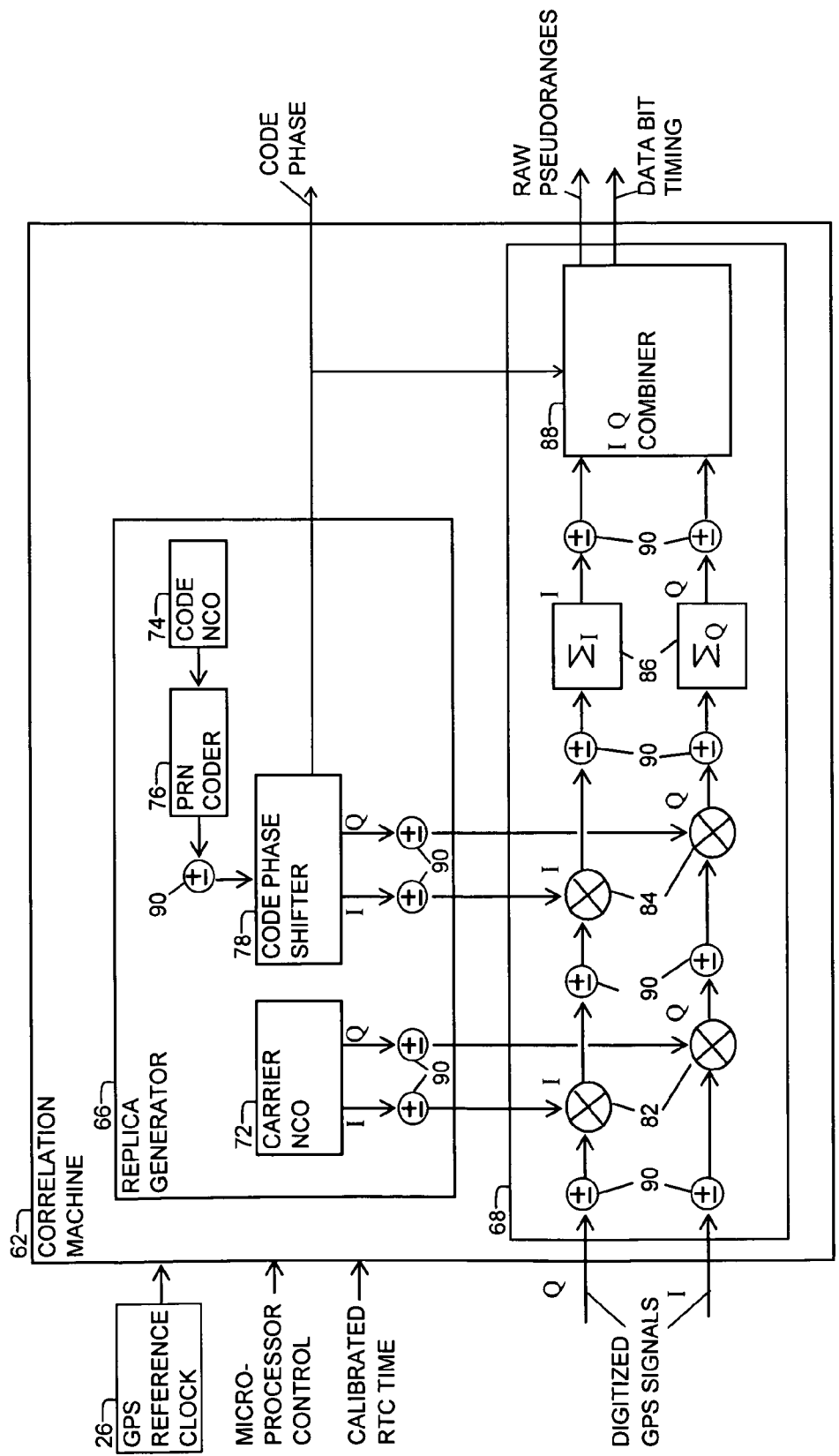
FIG. 5 is a block diagram of a correlation machine of the signal navigation processor of FIG. 4.

FIG. 5 is a block diagram of the correlation machine 62. The correlation machine 62 integrates the digitized representations of the GPS satellite signals by correlating I and Q GPS satellite signals with I and Q GPS replica signals. The I and Q GPS replica signals include I and Q GPS replica carrier signals and I and Q GPS replica code signals.

The I and Q GPS satellite signals (and their digitized I and Q satellite signal representations) and the I and Q GPS replica signals are spread by pseudorandom noise (PRN) codes. Each GPS satellite has its own PRN code. I and Q correlation levels are determined for several or all possible time or code phase offsets within a code epoch between the GPS satellite signals and the replica signals. The code phase offset that provides the highest combined I and Q correlation level for a particular GPS satellite is placed in consideration as the raw pseudorange for that GPS satellite. Typically, the correlation machine 62 has several parallel independent systems having replicas and channels where each replica and channel is adapted for integrating the digitized GPS signals according to a particular PRN code.

The correlation machine 62 functionally includes a replica generator 66 and a channel 68. The replica generator 66 includes a carrier numerically controlled oscillator (NCO) 72, a code numerically controlled oscillator (NCO) 74, a PRN coder 76 and a code phase shifter 78. The Doppler frequency shifts are estimated from the ephemeris orbital parameters and the expected position of the GPS receiver 10 stored in the hot start memory 14, and a clock time that is accurate to several tens of seconds.

The carrier NCO 72 uses a reference signal from the GPS reference clock 26 and the Doppler shift estimates for generating I and Q GPS replica carrier signals at the expected carrier frequency of the I and Q digitized GPS signals. For signal acquisition, several carrier frequencies may need to be tried in an iterative or a parallel frequency search in order to find a carrier frequency that enables a code search, described below, to discover a code phase offset that provides a level of correlation that indicates that signal power has been found.

The code NCO 74 uses a reference signal from the GPS reference clock 26 for generating a code base signal. The code base signal drives the PRN coder 76 for generating I and Q pseudorandom noise (PRN) code signals corresponding to the spreading codes for the GPS satellites. The code phase shifter 78 shifts the PRN code signals by designated code phase offsets for a code phase search. The code phase offsets are locally known with respect to the GPS reference clock 26 for providing the I and Q GPS replica code signals. At turn on of the GPS receiver 10, the code phase offset is shifted in a search until a code phase having the highest combined I and Q correlation level is discovered. Alternatively, the replica generator 66 provides the replica PRN code at several code phase offsets in parallel and the channel 68 performs the correlations in parallel.

The channel 68 includes I and Q carrier multipliers 82, I and Q code multipliers 84, I and Q accumulators 86 and an IQ combiner 88. The I and Q carrier multipliers 82 mix the I and Q digitized GPS signals with the I and Q GPS replica carrier signals for wiping out carrier frequency variations and providing intermediate I and Q signals at baseband or pseudo-baseband. The I and Q code multipliers 84 mix the I and Q intermediate GPS signals with the I and Q GPS replica code signals for providing I and Q code comparisons for each increment of code phase. The I and Q accumulators 86 accumulate the I and Q code comparisons over one or more code epochs for providing I and Q correlations. The IQ combiner 88 combines the I and Q correlations, preferably by summing their squares, and determines the code phase offset that provides the highest correlation level. When certain other criteria are met, the code phase offset having the highest combination level is the raw pseudorange.

Code Phase Search Assist

Figure 6:
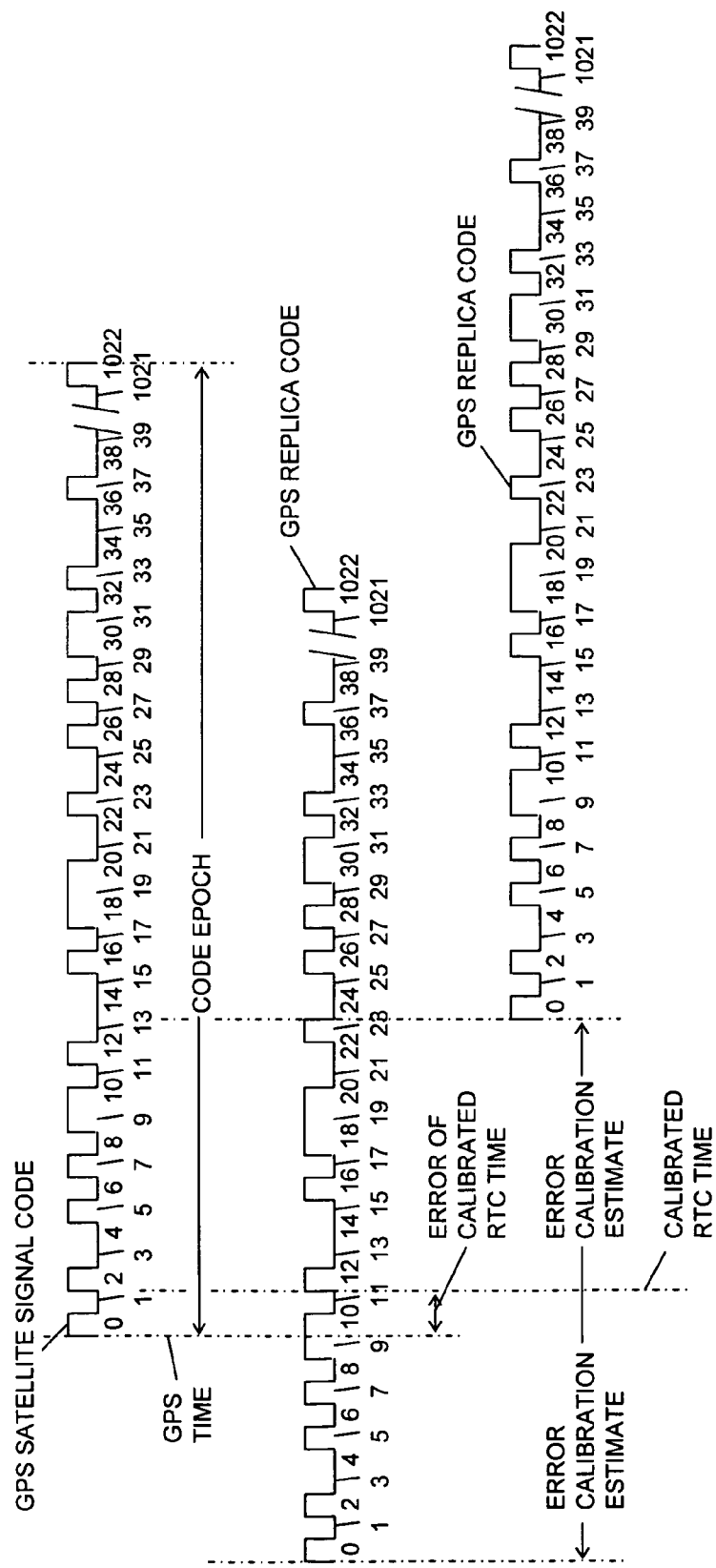
FIG. 6 is a timing diagram of an assisted pseudorandom noise (PRN) code search in the signal navigation processor of FIG. 4.

FIG. 6 is a timing diagram illustrating a GPS PRN C/A code search where the search is internally assisted by the calibrated RTC time. The GPS satellite signal C/A code is a PRN pattern (illustrated conceptually) of 1023 bits or chips. The length of time for the code to repeat is known as a code epoch. The replica generator 66 generates the GPS replica code as a signal having most or all of the 1023 chips for both I and Q. Normally, the GPS receiver 10 is required to try most or all of the 1023 chips in one-half chip or smaller increments of code phase and the channel 68 determines I and Q correlation levels for each of these in increments so that at least 2046 correlation levels for each I and Q are determined for whatever integration time period is used.

In the internally assisted code search, the calibrated RTC time is used to dispose an initial code phase offset to a chip, or fraction of a chip, and search only the code phase offsets within a range of chips equivalent to plus and minus the calibration error estimate. In the illustrative case, the calibration error estimate is shown as twelve chips (twelve microseconds for the GPS C/A code) and the actual calibrated RTC time error (unknown at this point) is shown as two chips (two microseconds for the GPS C/A code). The code search time with the internal assistance will be reduced about by a ratio of the code epoch to the code search range.

Integration Time Period Assist

The I accumulator 86 despreads the GPS signal by accumulating (integrating the signal) the I code comparisons for each increment of replica code phase offset over a selected integration time period (also known as pre-detection interval or PDI). The Q accumulator 86 operates in a similar manner. The integration time period may be a single code epoch. However, in order to improve signal sensitivity, the integration time period may be several code epochs where code comparisons are accumulated over several epochs for each code phase offset. For example, the I and Q code comparisons for a first code phase for a first code epoch are added to the I and Q code comparisons for the first code phase for a second code epoch and so on.

Figure 7A:
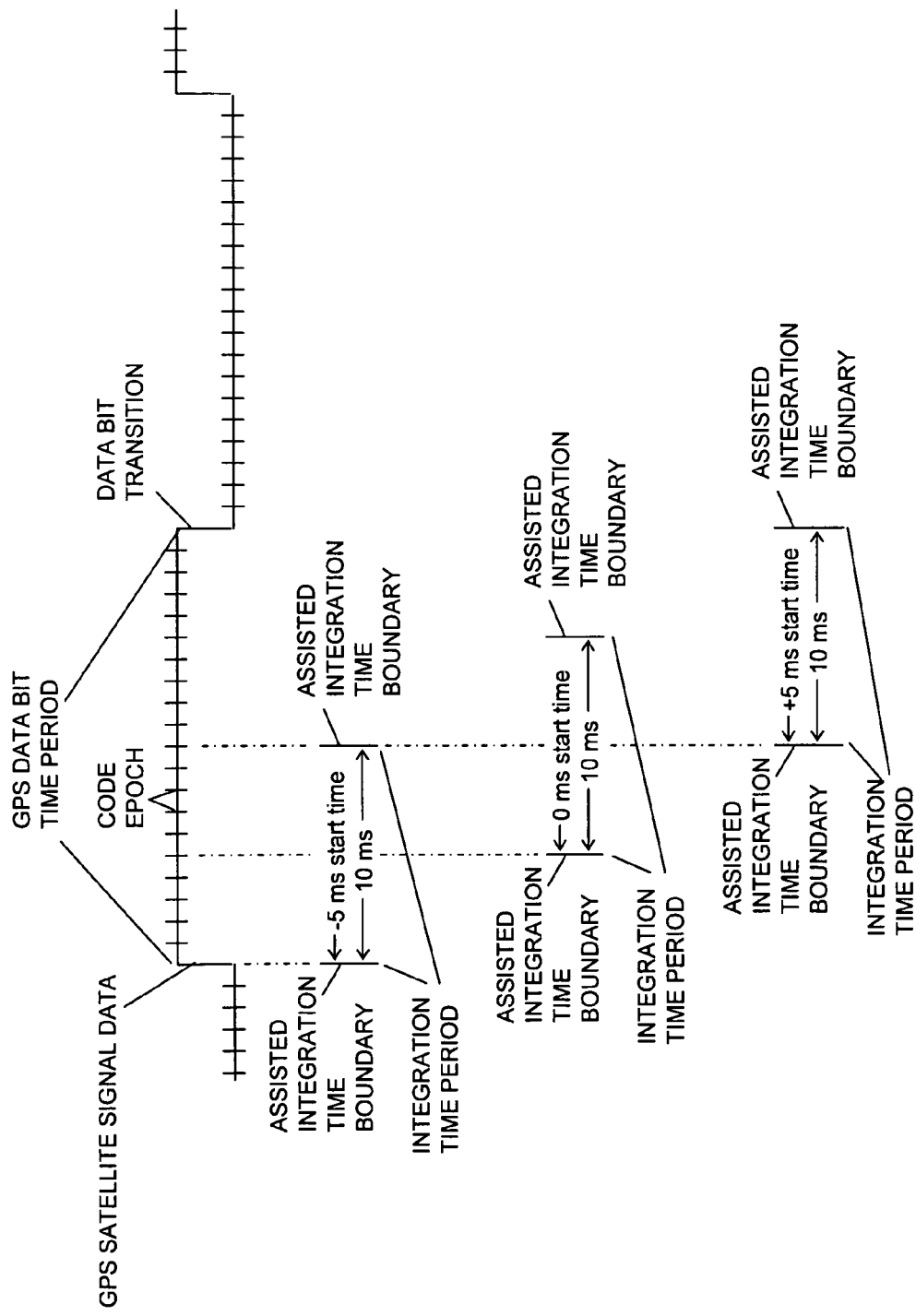
FIGS. 7A, 7B and 7C are timing diagrams showing exemplary first, second and third assisted integration time period boundaries in the GPS receiver of FIG. 1.
Figure 7B:
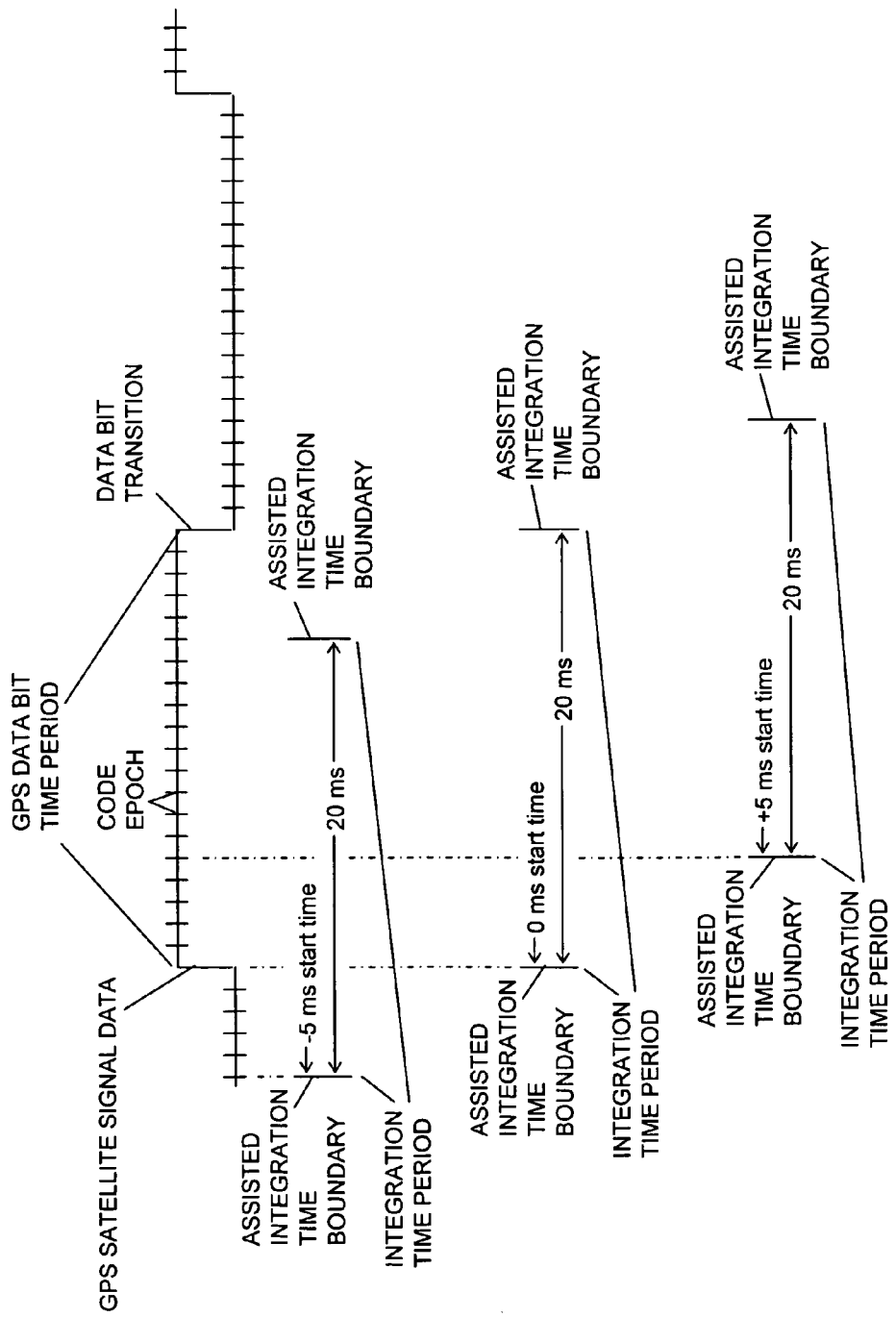
Figure 7C:
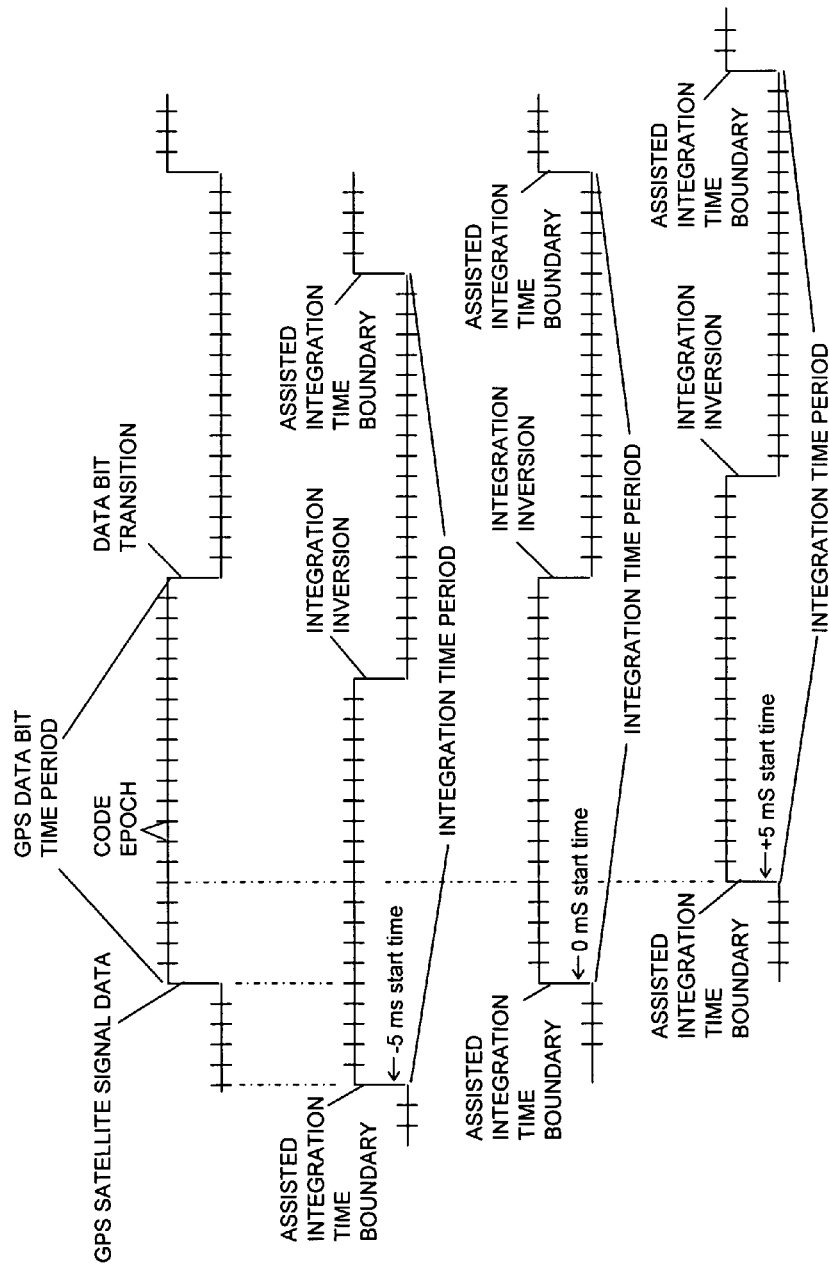

FIGS. 7A, 7B and 7C are exemplary timing diagrams illustrating 10 millisecond, 20 millisecond and 40 millisecond integration time periods where the boundaries are disposed with the assistance of the calibrated RTC time. The stop boundary equals the start boundary plus the integration time period. The exemplary cases show the calibration error estimate as 5 milliseconds. However, other cases can be constructed having calibration error estimates at least in the range of 1 to 10 milliseconds or more.

The GPS satellite signal C/A code has data bit time periods of 20 milliseconds. The C/A code epochs are one millisecond. The GPS signal code may be inverted by data bit sense inversions (1 to 0 or 0 to 1) at 20 millisecond intervals. An inversion of the code that is not expected causes the integration for the code epochs that are inverted to degrade the effectiveness of the integration process by subtracting from the integration for the code epochs that are not inverted.

FIG. 7A shows an integration time period of 10 milliseconds. The integration time boundaries are illustrated for actual time errors (not known at this point) of the calibrated RTC time of minus 5 milliseconds, 0 milliseconds and plus 5 milliseconds. It can be seen in the illustration that the integration will not suffer degradation from inverted code epochs.

FIG. 7B shows an integration period of 20 milliseconds. The integration time boundaries are illustrated for actual time errors (not known at this point) of the calibrated RTC time of minus 5 milliseconds, 0 milliseconds and plus 5 milliseconds. It can be seen in the illustration that the maximum errors of minus or plus 5 milliseconds cause the integration effectiveness to degrade to one half (one-quarter of the time period inverted negates one-quarter of the time period not inverted) in the cases where a GPS data bit inverts. However, only about one-half the consecutive GPS data bits are inverting so on the average, the integration process retains greater than one half effectiveness for finding signal power.

FIG. 7C shows an integration time period of 40 milliseconds. The integration time boundaries are illustrated for actual time errors (not known at this point) of the calibrated RTC time of minus 5 milliseconds, 0 milliseconds and plus 5 milliseconds. The hot start data provides expected GPS data bit inversions for inverting the integration of the GPS signal in order to compensate for the inversion of the data bits. It can be seen in the illustration that the maximum errors of minus or plus 5 milliseconds cause the integration effectiveness to degrade to one half (one-quarter of the time period inverted negates one-quarter of the time period not inverted) in the cases where all GPS data bit are inverting. However, only about one-half the consecutive GPS data bits are inverting and so the integration process retains more than one half its effectiveness for finding signal power.

Referring back to FIG. 5, in the case where the integration period is greater than a GPS data bit time period (for example 40 milliseconds), a polarizer 90 uses the calibrated RTC time and the expected data bits in the hot start data for depolarizing the integration of the GPS signal by inverting a representation of the GPS satellite signal or the GPS replica signal at the time point of the data bit transition.

The depolarizer 90 is disposed in the path of only one of the following signals: the I and Q GPS replica carrier signals from the carrier NCO 72; the PRN code signal from the PRN coder 76; the I and Q GPS replica code signals from the code phase shifter 78; the digitized I and Q GPS signals entering the I and Q carrier multipliers 82; the intermediate I and Q signals between the I and Q carrier multipliers 82 and the I and Q code multipliers 84; the I and Q code comparisons from the I and Q code multipliers 84, or the accumulated I and Q correlations from the I and Q accumulators 86.

Resolution of the Integer Assist

After finding GPS signal power, GPS data bit timing is determined based on inversions of the GPS code correlations. The integer resolver 64 (FIG. 4) uses data bit timing for determining modulo data bit time period times (20 milliseconds for GPS C/A code) and uses the calibrated RTC time to assign the GPS times to the modulo data bit times.

Figure 8:
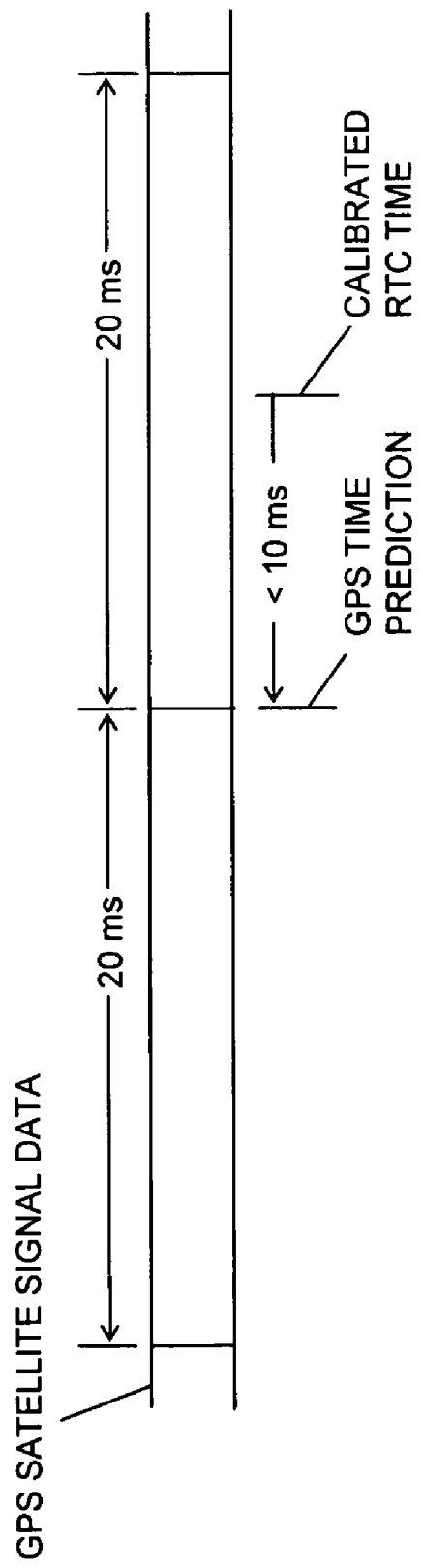
FIG. 8 is timing diagram showing assisted pseudorange determination in the GPS receiver of FIG. 1.

FIG. 8 is an exemplary timing diagram illustrating the disposition of the calibrated RTC time with the 20 millisecond data bits of the GPS satellite signal. The calibrated RTC time error of less than 10 milliseconds from a data bit transition time is used to predict the actual GPS time at that data bit transition eliminating the conventional need to wait for a Z-Count in the GPS signal.

Satellite Location-in-Space Assist

When signal power is found and the integer number of code epochs is resolved, the navigation machine 65 uses the GPS satellite pseudoranges with equations embedded in memory of signal navigation processor 28 for linearizing the pseudoranges about the approximate position of the GPS antenna 22 and then resolving the time offset of the GPS reference clock 26 and position from the linearized pseudoranges. The equations for four satellites have four unknowns: the three dimensions of position of the GPS antenna 22 and the time offset. In order to resolve these equations, the locations-in-space of typically at least four GPS satellites must be computed from the hot start data for ephemeris orbital parameters retained in the hot start memory 14 or received from an external source and the calibrated RTC time refined to match the data bit times.

Figure 9:
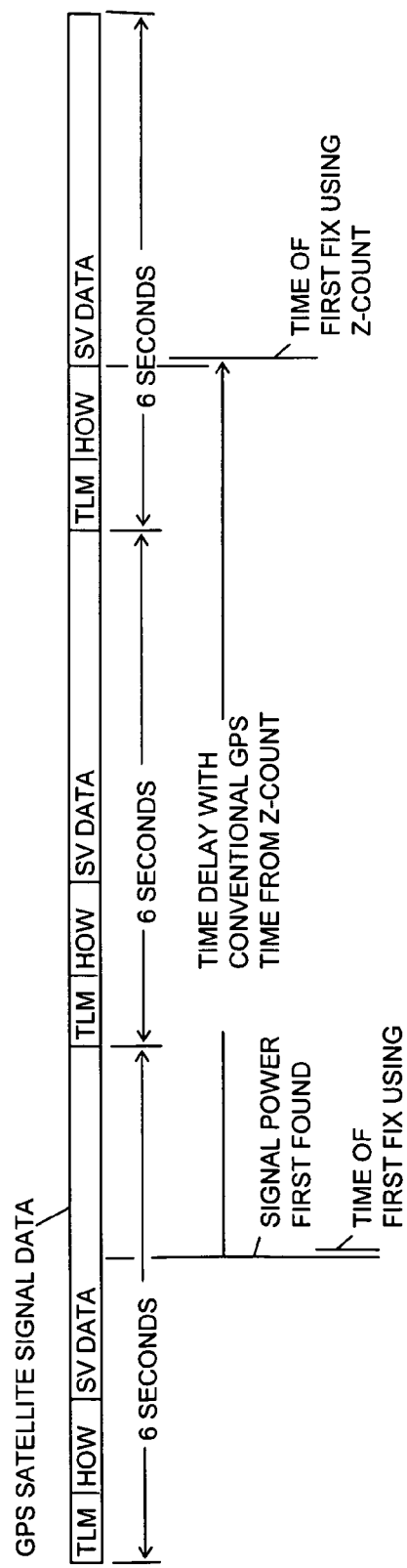
FIG. 9 is a timing diagram comparing a conventional Z-count to the calibrated RTC time.

FIG. 9 is a time diagram comparing the operation of a conventional technique using the GPS signal Z-Count using the calibrated RTC time. The GPS data bits are known to be synchronized to transmit at the same times beginning with 00 hours, 00 minutes, 00.000 seconds of each GPS week and continuing throughout the week. The GPS satellite C/A signal data is organized into subframes of 6 seconds each. The subframes have a TLM preamble, then a HOW word having Z-Count data for the time-of-transmission of the GPS signal, and then parametric GPS satellite (SV) data for ephemeris, almanac, health, and the like.

Conventional GPS receivers determine the GPS time for computing satellite locations-in-space by reading the Z-Count in the HOW after first recognizing the start of a subframe from the TLM. Depending upon when a GPS receiver is ready, typically about 9 seconds (1½ subframes) is required to learn the Z-Count in order to guard against the case where a co-incidence of bits imitates the TLM. The navigation machine 65 instead uses data bit timing for determining modulo data bit time period times (20 milliseconds for GPS C/A code) and uses the calibrated RTC time to assist in the assignment of the GPS times-of-transmission to the modulo data bit times.

Figure 10:
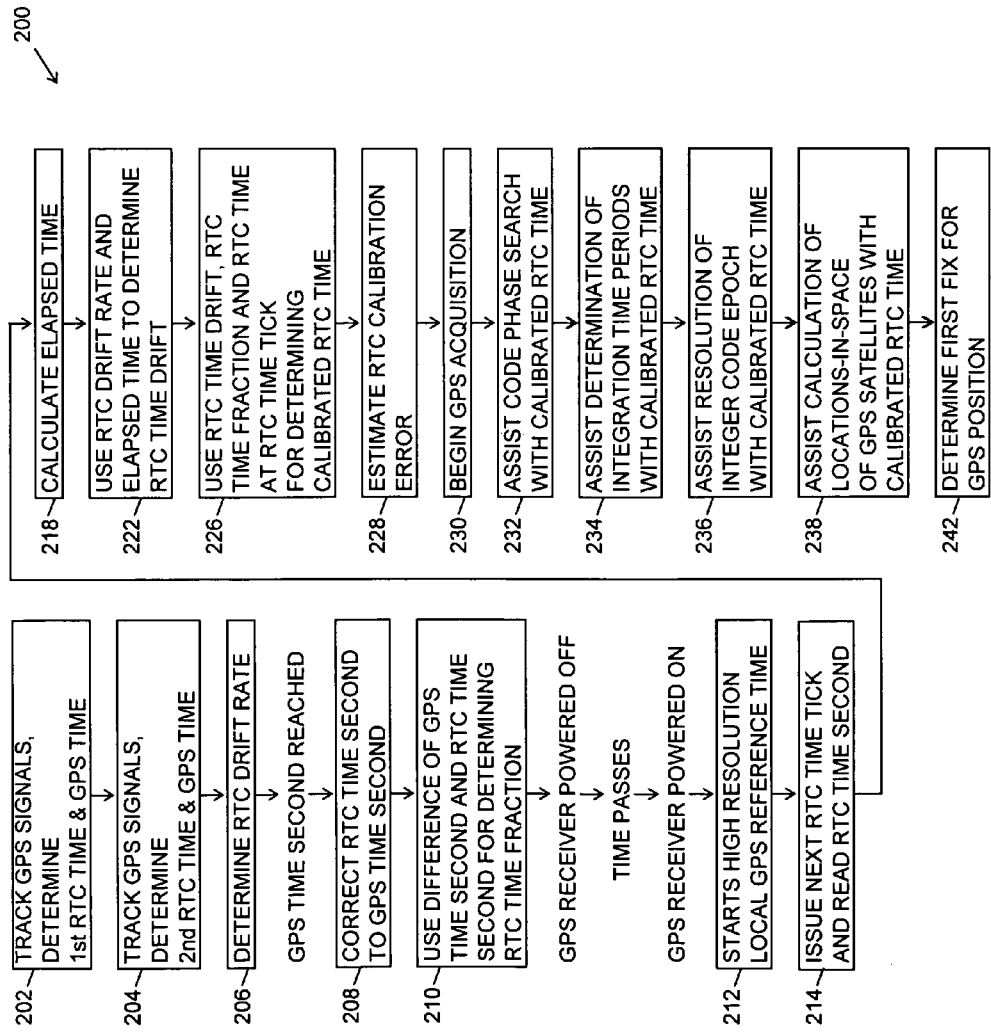
FIG. 10 is a flow chart of a GPS method for a fast time to first fix by calibration of a real time clock.

FIG. 10 is a flow chart of steps of a method 200 for a fast time to first fix by calibration of a real time clock 12. The method may be embodied as an article of manufacture by forming the steps into the article of manufacture where the steps can be read by computing device to give directions to the GPS receiver 10 for carrying out the steps. In a step 202 the GPS receiver 10 tracks GPS signals and provides GPS time and position fixes. The GPS signal tracking is accomplished in phase or frequency lock loops using feedback from GPS signal correlations for adjusting the frequencies and times of local GPS reference signals. At a change of RTC time, preferably using an RTC time tick, a first RTC time and a corresponding first GPS time are noted.

In a step 204 a second RTC time and corresponding GPS time are noted at a change of RTC time. In a step 206 the first and second RTC times and first and second GPS times are compared for computing an RTC drift rate of the RTC time relative to the GPS time. The RTC drift rate is stored in the hot start memory 14.

The current GPS time instant is used to correct the RTC time at an RTC time tick in a step 208. The time instants and time ticks have a certain time period, typically have one second. The effective time of the RTC time second occurs at the RTC time tick. In a step 210 the fraction of the time period between the GPS time at the RTC time tick and the modulo GPS time instant that is used to update the RTC time at the RTC time tick is determined and stored in non-volatile memory as the RTC time fraction. At some time later the power for the GPS receiver 10 is turned off.

When the GPS receiver 10 has power off, it is in a power down or standby mode where GPS signals are not tracked and the GPS receiver 10 is not generating local GPS reference frequency and time signals. The real time clock continues to maintain RTC time. Time passes and then the power for the GPS receiver 10 is turned on again.

When the GPS receiver 10 is turned on, it starts generating the local high resolution GPS reference frequency and time signals in a step 212. In a step 214 a first post turn on RTC time tick is issued by the real time clock 12 and the RTC time is read. The last RTC time before the GPS receiver 10 was turned off is retrieved in a step 218 and used with the current RTC time for determining an elapsed power down time where the GPS receiver 10 was in the power off condition. In a step 222 the RTC drift rate is retrieved and used with the power down time for providing a time drift. Then, in a step 226 the RTC time drift and the RTC time fraction are used to calibrate the RTC time and expand the coarse RTC time data to provide fine resolution. The calibrated RTC time is used for providing internal assistance to the GPS receiver 10 in the acquisition and processing the GPS signals for providing a first fix.

At some time in design or manufacture or in service, an error estimate is determined and stored in the GPS receiver 10 for the difference between the RTC drift rate that can be ascertained by measurement and a true, but unknown, drift rate. The error estimate is used in a step 228 with the power down time for providing a calibration error estimate for the calibrated RTC time. In a step 230 the GPS receiver 10 begins the process of acquiring GPS signals with the assistance of the calibrated RTC time. The level of the calibration error estimate is used to determine the assistance that can be provided. In a step 232 when the calibration error estimate is less than about one-half a code epoch, the calibrated RTC time is used for assisting a GPS code search by pointing the code search to a subset of the possible code phases in the code epoch. The size of the subset may be determined by the calibration error estimate. The subset is centered about the code phase offset corresponding to the calibrated RTC time and the range of the subset may correspond to plus and minus the calibration error estimate. The assisted code search reduces the time that is required for the code phase search for finding signal power.

When the calibration error estimate is less than about one-quarter a data bit time period, the calibrated RTC time is used in a step 234 for assisting the determination of the boundaries of integration time periods over multiple code epochs. The GPS signal is integrated over the integration time periods for finding signal power in code searches. The assisted integration time periods improve the sensitivity of the GPS receiver 10 to low level GPS signals.

When the calibration error estimate is less than about one-half a bit time period the calibrated RTC time is used in a step 236 for assisting the resolution of the integer numbers of code epochs in the pseudoranges to the GPS satellites. The calibrated RTC time is applied to the time of a proximate GPS data bit transition for estimating the current GPS time.

After the pseudoranges are known, when the calibration error estimate is less than about one-half a bit time period, the calibrated RTC time is used in a step 238 with the ephemeris orbital parameters for assisting the determination of the locations-in-space of the GPS satellites. The use of the calibrated RTC time for epoch integer resolution and locations-in-space of the satellites eliminates the need to wait for Z-counts in the GPS signals. In a step 242 the pseudoranges to the GPS satellites and the locations-in-space of the GPS satellites are used for resolving the time ambiguity of the GPS reference clock 26 and computing a GPS time and position fix.

Although the present invention has been described in terms of presently preferred embodiments, it is to be understood that such disclosure is not to be interpreted as limiting. Various subsets and equivalents will no doubt become apparent to those skilled in the art after having read the above disclosure. Accordingly, it is intended that the appended claims be interpreted as covering the true spirit and scope of the invention.

The invention claimed is:

1. A global navigation satellite system (GNSS) receiver, comprising:
   an always-on real time clock to maintain an RTC time having RTC time ticks of a certain time period;
   an RTC calibrator to determine a time fraction of said certain time period while the receiver has power on wherein said time fraction is a difference at a one of said RTC time ticks between GNSS-based time at a fine resolution and said GNSS-based time at a time resolution of said certain time period; and to combine said time fraction with a turn on said RTC time corresponding to turn-on of the receiver at a one of said time ticks after a power down time of the receiver to calibrate said turn-on RTC time when the receiver is switched from power off to power on; and
   a signal navigation processor to use said calibrated RTC time to assist in determination of a GNSS-based fix.

2. The receiver of claim 1, wherein:
   the RTC calibrator includes an RTC time expander to calibrate said turn-on RTC time by adding said time fraction to said turn-on RTC time.

3. A global navigation satellite system (GNSS) receiver, comprising:
   an always-on real time clock to maintain an RTC time having increments of a certain time period;
   an RTC calibrator to determine a time fraction of said certain time period while the receiver has power on; and to combine said time fraction with said RTC time to calibrate said RTC time when the receiver is switched from power off to power on; and
   a signal navigation processor to use said calibrated RTC time to assist in determination of a GNSS-based fix; wherein:
   the RTC calibrator includes a power down calculator to use said RTC time to determine an elapsed power down time; and an RTC time expander to scale said power down time with an estimated RTC drift rate to calibrate said power down time and use said calibrated power down time to calibrate said RTC time when the receiver is switched from power off to power on.

4. A global navigation satellite system (GNSS) receiver, comprising:
   an always-on real time clock to maintain an RTC time having increments of a certain time period;
   an RTC calibrator to determine a time fraction of said certain time period while the receiver has power on; and to combine said time fraction with said RTC time to calibrate said RTC time when the receiver is switched from power off to power on; and
   a signal navigation processor to use said calibrated RTC time to assist in determination of a GNSS-based fix; and wherein:
   the RTC calibrator further includes a drift rate calculator to estimate an RTC drift rate of said real time clock by comparisons between said RTC time and a GNSS-based time while said GNSS receiver has power on; and
   the signal navigation processor is configured to use said RTC drift rate estimate to calibrate said RTC time when the receiver is switched from power off to power on.

5. The receiver of claim 4, wherein:
   the RTC calculator further includes a calibration error estimator to estimate a difference between said estimated RTC drift rate and an actual RTC drift rate to provide a calibration error estimate; and
   the signal navigation processor is configured to use said calibration error estimate to determine a manner in which said calibrated RTC time is used to assist said determination of said fix.

6. The receiver of claim 1, wherein:
   the signal navigation processor is configured to receive a GNSS signal having spread spectrum code epochs, use said calibrated RTC time to define an integration time period covering several said code epochs, integrate said GNSS signal over said integration time period to acquire said GNSS signal, and use said acquired GNSS signal to determine said fix.

7. The receiver of claim 1, wherein:
the signal navigation processor is configured to receive a GNSS signal having a spread spectrum code having many code phases, use said calibrated RTC time to designate a subset of said code phases, search only said code phase subset to acquire said GNSS signal, and use said acquired GNSS signal to determine said fix.

8. The receiver of claim 1, wherein:
the signal navigation processor is configured to receive a GNSS signal having data bits having code epochs, use said calibrated RTC time to determine an integer number of said code epochs in a pseudorange between the receiver and a GNSS signal source transmitting said GNSS signal, and use said pseudorange to determine said fix.

9. The receiver of claim 1, wherein:
the signal navigation processor is configured to receive a GNSS signal from a GNSS signal source, use said calibrated RTC time to determine a location-in-space for said GNSS signal source, and use said location-in-space to determine said fix.

10. The receiver of claim 1, wherein:
the real time clock is configured to maintain said RTC time with said certain time period of about one second derived from a resonator having a resonant frequency in a range of 32 to 33 kHz while operating on less than one milliwatt of power while the receiver has power off.

11. A global navigation satellite system (GNSS) method in a GNSS receiver, comprising:
maintaining RTC time having RTC time ticks of a certain time period;
determining a time fraction of said certain time period while the receiver has power on wherein said time fraction is a difference at a one of said RTC time ticks between GNSS-based time at a fine resolution and said GNSS-based time at a time resolution of said certain time period; and combining said time fraction with a turn on said RTC time corresponding to turn-on of the receiver at a one of said time ticks after a power down time of the receiver for calibrating said turn-on RTC time when the receiver is switched from power off to power on; and
using said calibrated RTC time for assisting in determination of a GNSS-based fix.

12. The method of claim 11, wherein:
combining said time fraction is adding said time fraction to said turn-on RTC time for calibrating said turn-on RTC time.

13. A global navigation satellite system (GNSS) method in a GNSS receiver, comprising:
maintaining an RTC time having increments of a certain time period;
determining a time fraction of said certain time period while the receiver has power on; and combining said time fraction with said RTC time for calibrating said RTC time when the receiver is switched from power off to power on;
using said calibrated RTC time for assisting in determination of a GNSS-based fix;
using said RTC time for determining an elapsed power down time;
estimating an RTC drift rate;
scaling said power down time with said estimated RTC drift rate for calibrating said power down time; and
using said calibrated power down time for calibrating said RTC time when the receiver is switched from power off to power on.

14. A global navigation satellite system (GNSS) method in a GNSS receiver, comprising:
maintaining an RTC time having increments of a certain time period;
determining a time fraction of said certain time period while the receiver has power on; and combining said time fraction with said RTC time for calibrating said RTC time when the receiver is switched from power off to power on;
using said calibrated RTC time for assisting in determination of a GNSS-based fix;
estimating an RTC drift rate of said RTC time by comparisons between said RTC time and a GNSS-based time while said GNSS receiver has power on; and
using said RTC drift rate estimate for calibrating said RTC time when the receiver is switched from power off to power on.

15. The method of claim 14, further comprising:
estimating a difference between said estimated RTC drift rate and an actual RTC drift rate to provide a calibration error estimate; and
using said calibration error estimate for determining a manner in which said calibrated RTC time is used for assisting said determination of said fix.

16. The method of claim 11, further comprising:
receiving a GNSS signal having spread spectrum code epochs;
using said calibrated RTC time for defining an integration time period covering several said code epochs;
integrating said GNSS signal over said integration time period for acquiring said GNSS signal; and
using said acquired GNSS signal for determining said fix.

17. The method of claim 11, further comprising:
receiving a GNSS signal having a spread spectrum code having many code phases;
using said calibrated RTC time for designating a subset of said code phases;
searching only said code phase subset for acquiring said GNSS signal; and
using said acquired GNSS signal for determining said fix.

18. The method of claim 11, further comprising:
receiving a GNSS signal having data bits having code epochs;
using said calibrated RTC time for determining an integer number of said code epochs in a pseudorange between the receiver and a GNSS signal source transmitting said GNSS signal; and
using said pseudorange for determining said fix.

19. The method of claim 11, further comprising:
receiving a GNSS signal from a GNSS signal source;
using said calibrated RTC time for determining a location-in-space for said GNSS signal source; and
using said location-in-space for determining said fix.

20. The method of claim 11, wherein:
maintaining said RTC time includes maintaining said RTC time with said certain time period of about one second derived from a resonator having a resonant frequency in a range of 32 to 33 kHz while operating on less than one milliwatt of power while the receiver has power off.

21. An article of manufacture that may be read by a computing device for carrying out the following steps:

maintaining RTC time having RTC time ticks of a certain time period;

determining a time fraction of said certain time period while the computing device has power on wherein said time fraction is a difference at a one of said RTC time ticks between GNSS-based time at a fine resolution and said GNSS-based time at a time resolution of said certain time period; and combining said time fraction with a turn on said RTC time corresponding to turn-on of the computing device corresponding to a one of said time ticks after a power down time of the computing device for calibrating said turn-on RTC time when the computing device is switched from power off to power on; and using said calibrated RTC time for assisting in determination of a GNSS-based fix.

\* \* \* \* \*